C. H. WILLS.
BEARING ASSEMBLY.
APPLICATION FILED NOV. 6, 1920.
1,421,644.
Patented July 4, 1922.
2 SHEETS—SHEET 1.
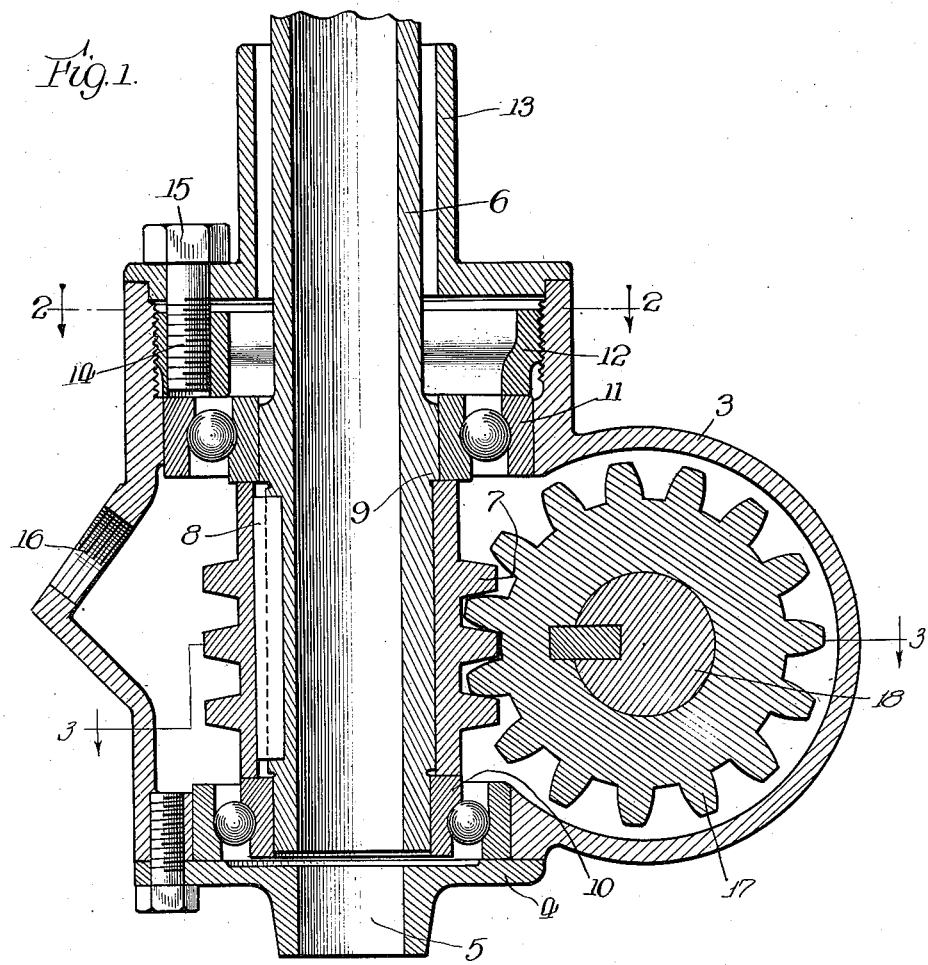
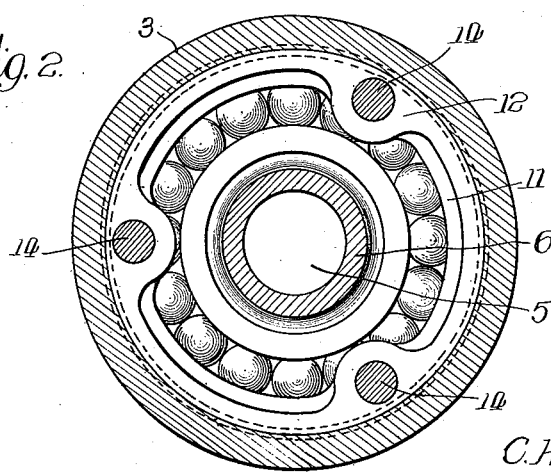
Witness:
A. J. Sauser.
Inventor:
C. Harold Wills,
By Wilkinson Huxley Byron & Knight
Attys.

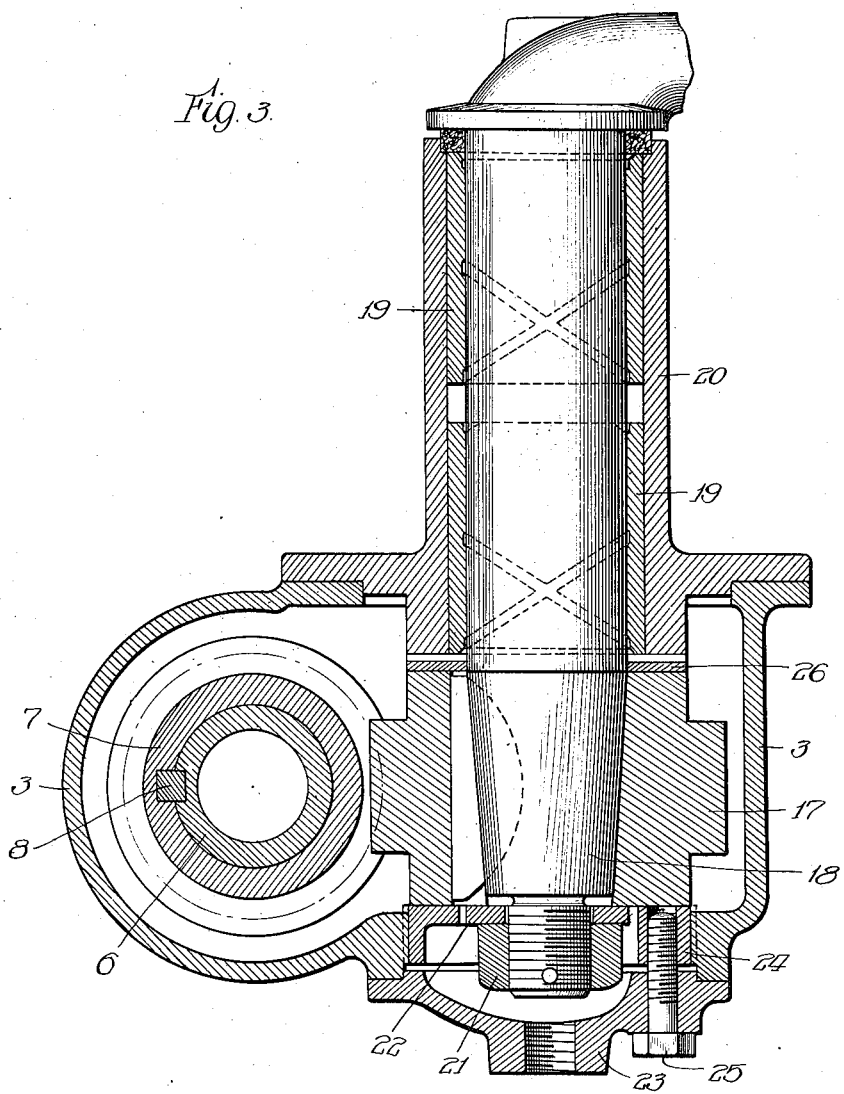

UNITED STATES PATENT OFFICE.

CHILDE HAROLD WILLS, OF MARYSVILLE, MICHIGAN.

BEARING ASSEMBLY.

1,421,644.    Specification of Letters Patent.    Patented July 4, 1922.

Application filed November 6, 1920. Serial No. 422,158.

*To all whom it may concern:*

Be it known that I, CHILDE HAROLD WILLS, a citizen of the United States, residing at Marysville, in the county of St. Clair and State of Michigan, have invented certain new and useful Improvements in Bearing Assemblies, of which the following is a specification.

This invention relates to a new and improved gear housing, and more specifically to a gear housing structure enclosing thrust bearings having adjustable retaining means adapted to be maintained in adjusted relation to a removable portion of the housing. The invention is especially adapted for use in connection with the steering columns of automobiles and has been shown in that relation although it is obviously of broad application to structures of the same general character.

In the gears of the steering column of automobiles it is highly desirable that all play or back lash be eliminated. Any play not only causes undesirable vibration of the steering wheel, but also has a tendency to permit slight movement of the vehicle wheels themselves, which has a very deleterious effect upon the tires. Furthermore, the vibration tends to wear the contacting surfaces of the gears thereby increasing the back lash. The normal use of the gears in time causes a small amount of wear which it is desirable to take up, and therefore some adjustable means in relation to the bearings are essential. This bearing requires accurate adjustment and it is desirable that means be provided whereby the adjustable bearing support may be removed and replaced in connection with oiling or cleaning the bearing without loss of adjustment.

It is an object of the present invention to provide a new and improved gear housing having adjustable bearing support means associated therewith, the bearing support being associated with a removable portion of the housing in such manner that they may be maintained in any desired relation. It is a further object to provide a device of the character described wherein the bearing support means may be readily adjusted. It is also an object to provide a housing in which the bearings may be readily removed for cleaning or inspection. It is an additional object to provide a gear housing and associated members which are simple in construction, efficient in operation, and which may be manufactured at relatively low cost. Other and further objects will appear as the description proceeds.

I have shown a preferred embodiment of my invention in the accompanying drawings in which—

Figure 1 is a vertical section through the gear housing, the steering column gear and associated members;

Figure 2 is a cross section on line 2—2 of Figure 1; and,

Figure 3 is a cross section on line 3—3 of Figure 1.

In the drawings the gear housing 3 is provided with the lower closure 4 having a central opening adapted to permit the passage of control rods or wires (not shown) which may pass downward through the central opening 5 of the tubular steering column 6. The gear sleeve 7 is fitted upon the lower portion of the column 6 and is maintained in fixed circumferential relation thereto by the spline 8. A shoulder 9 of the steering column 6 rests upon the upper surface of the sleeve 7, the sleeve thus supporting the column 6. The lower surface of the sleeve 7 rests upon the lower thrust bearing 10, the opposite side of which rests against the lower housing cap 4. The upper thrust bearing 11 surrounds the column 6 and bears upon the upper surface of the sleeve 7. The adjustable retaining collar is threaded into the upper opening in the housing 3, which opening is covered by the upper closure 13, as shown in Figure 2. This collar 12 is extended inwardly to form a plurality of ears having threaded openings therein adapted to receive the bolts 14. These bolts extend through the closure 13 and are provided with heads 15 bearing against the outer surface of that closure. The casing 3 is provided with an opening 16 for the introduction or removal of lubricant.

As shown in Figures 1 and 3, the spur gear 17 is in mesh with the worm gear on sleeve 7, the gear 17 being keyed to the horizontal shaft 18. The shaft 18 is carried by the bearings 19 in the housing 20, the latter being fastened to the housing 3. The gear 17 is held in place upon the shaft 18 by the nut 21 and washer 22. The end closure 23 is connected to the thrust bearing 24 by screws 25, and the thrust bearing is threaded into the housing. The thrust washer 26 is interposed between the opposite face of the gear 17 and the housing 20.

Referring now to Figure 1, the sleeve 7 is maintained in place between the two thrust bearings 10 and 11, these bearings as shown being also adapted to reduce friction during rotation of the shaft. In order to prevent play or back lash, it is necessary that these two bearings be maintained firmly against the opposite ends of the sleeve 7. This adjustment, however, must not be so tight as to cause binding. The adjustment is effected by means of the collar 12 and, in assembling the device or in varying the adjustment when play is found to be present, the collar 12 is carefully brought down with the proper pressure against the bearing 11. The closure 13 is then put in place and the bolts 14 inserted through the openings in the closure 13 and screwed into collar 12 until their heads 15 bring up against the outer surface of the closure and hold it in firm engagement with the casing.

If now it is desired at any time to remove the closure for the purpose of examining, cleaning, or lubricating the interior or the parts therein, the closure 13, bolts 14, and collar 12 may be removed as a unit by applying a wrench to the closure 13. When these parts are replaced as a unit, the collar 12 is screwed into an opening in the casing by means of a wrench applied to the closure 13 until the closure is brought up firmly against the casing and at this point the collar 12 will be in exactly the same adjustment as before its removal. This replacement of the closure may thus be made rapidly and without especial care, with perfect assurance that the previous adjustment of the bearing will be maintained.

It is, however, possible to vary this adjustment by first removing the bolts 14 and closure 13 and then rotating the collar 12 into firmer or lighter engagement with the bearing 11 as may be desired. The collar 12 may be operated by an internal wrench or may be operated through a wrench applied to the closure 13, the movement being transmitted to the collar 12 by the bolts 14 which would in this case be put in place screwed in only to such an extent as to assure that the engagement of the closure 13 with the casing 3 will not interfere with the adjustment of the collar 12. After the adjustment is secured, the bolts 14 are tightened to clamp closure 13 to the casing.

The thrust collar 24 and the closure 23 with their connecting bolts 25 are operated in a manner exactly similar to that which has just been described. The construction here is simplified by the fact that no ball bearings are used but this in no way affects the use or adjustment of the thrust collar.

The device therefore is extremely simple in construction and operation, and while it permits a ready variation in the adjustment of the bearings, it nevertheless permits easy and rapid removal and replacement of the bearings and the adjacent members without loss of adjustment.

While I have described more or less precisely the details of construction of my invention, I do not wish to be understood as limiting myself thereto, as I contemplate changes in form and the proportion of parts and substitution of equivalents as circumstances may suggest or render expedient, without departing from the spirit of my invention.

I claim:

1. In a bearing housing, a shaft passing into said housing and a thrust bearing associated with said shaft, a removable member secured to the housing adapted to retain the bearing in an adjusted position, and means whereby the removable member may be removed and returned, the means being adapted to stop the return at the adjusted position.

2. In a bearing housing, a shaft passing into said housing and a thrust bearing associated with said shaft, a removable member secured to the housing adapted to retain the bearing in an adjusted position and a stop member adapted to be adjustably connected to the removable member and to bear against a fixed portion of the housing.

3. In a bearing housing, a shaft passing into the housing, a thrust bearing surrounding the shaft, a removable collar threaded into the housing adapted to maintain the thrust bearing in adjusted relation to the shaft, a removable portion of the casing surrounding the shaft adjacent the collar, and adjustable means connecting the collar and closure.

4. In a bearing housing, a shaft passing into the housing, a thrust bearing surrounding the shaft, a removable collar adapted to maintain the thrust bearing in adjusted relation to the shaft, a removable portion of the casing surrounding the shaft adjacent the collar, and a plurality of bolts having portions threaded into the collar and having heads bearing against the closure.

5. In a bearing housing, a shaft passing into the housing, a thrust bearing surrounding the shaft, a collar threaded into the housing and adapted to engage the thrust bearing to maintain it in adjusted relation to the shaft, a removable portion of the casing surrounding the shaft adjacent the collar, and a plurality of bolts having portions threaded into the collar and having portions engaging the removable portion of the casing.

6. In a bearing housing, a shaft passing into the housing, a thrust bearing surrounding the shaft, a collar threaded into the housing and adapted to engage the thrust bearing to maintain it in adjusted relation to the shaft, a removable portion of the casing surrounding the shaft adjacent the collar, and a plurality of bolts having portions threaded into the collar and having heads bearing against the outer face of the removable portion of the casing whereby the removable portion is maintained in engagement with the fixed portion of the casing.

7. In a bearing housing, a shaft passing into the housing, a gear sleeve keyed to the shaft in the housing, a fixed bearing adjacent the lower end of the shaft, an adjustable thrust bearing engaging the upper end of the gear sleeve, a collar threaded into the casing and contacting with the upper face of the thrust bearing, a removable portion of the casing surrounding the shaft adjacent the collar, and a plurality of bolts having portions threaded into the collar and having heads bearing against the outer face of the removable portion of the casing whereby the removable portion is maintained in engagement with the fixed portion of the casing and the inward movement of the collar is limited.

Signed at Marysville, Michigan, this 19 day of October, 1920.

CHILDE HAROLD WILLS.